3,212,972
N-LOWER ALKYL-N-VINYLACETAMIDE AEROSOL SPRAY FORMULATIONS

Frederick E. Bailey, Jr., Charleston, W. Va., assignor to Union Carbide Corporation, a corporation of New York
No Drawing. Filed Aug. 21, 1962, Ser. No. 218,450
8 Claims. (Cl. 167—87.1)

This invention relates to novel aerosol spray formulations. More particularly, this invention relates to novel aerosol spray formulations containing copolymers of N-alkyl-N-vinylacetamides and vinyl esters as an essential ingredient thereof.

The copolymers suitable for use in the aerosol spray formulations of the instant invention contain polymerized N-alkyl-N-vinylacetamide units depicted by the formula

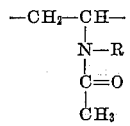

wherein R is an alkyl radical having from 1 to 3 carbon atoms, preferably from 1 to 2 carbon atoms, and polymerized vinyl ester units depicted by the formula

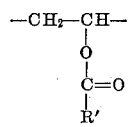

wherein R' is a radical selected from the group consisting of hydrogen and alkyl radicals having from 1 to 3 carbon atoms, preferably from 1 to 2 carbon atoms. These copolymers can contain from about 10 mole percent to about 95 mole percent of the polymerized N-alkyl-N-vinylacetamide, and from about 5 mole percent to about 90 mole percent of the polymerized vinyl ester. Preferably such copolymers contain from about 30 mole percent to about 70 mole percent of the polymerized N-alkyl-N-vinylacetamide, and from about 70 mole percent to about 30 mole percent of the polymerized vinyl ester.

The copolymers employed in the instant invention are soluble in water and various liquid organic compounds, and can be cast from solution to form self-supporting films. This makes them eminently suitable for use in aerosol spray formulations. Films formed from copolymers having a reduced viscosity of greater than about 0.1 in water at 30° C. are particularly tough, and are preferred for that reason; especially preferred are those having a reduced viscosity greater than about 0.4.

Illustrative of the water-soluble copolymers suitable for use in the instant invention are copolymers of N-methyl-N-vinylacetamide with vinyl acetate which contain from about 30 mole percent to about 70 mole percent of combined N-methyl-N-vinylacetamide, and copolymers of N-ethyl-N-vinylacetamide with vinyl propionate which contain from about 55 mole percent to about 80 mole percent of combined N-ethyl-N-vinylacetamide.

In addition to being soluble in water, copolymers of the type described are also soluble in various liquid organic compounds such as methanol, ethanol, isopropanol, and acetone, and self-supporting films can be cast from these solvents as well as from water. Whatever solvent is selected, it should be employed in the spray formulation in an amount sufficient to produce a solution containing from about 0.5 percent by weight to about 8 percent by weight, preferably from about 1 percent by weight to about 3 percent by weight, of the copolymer. A suitable aerosol propellant, such as $CCl_2F_2$ or $CCl_3F$, is added, and the formulation is ready for spraying.

The copolymers suitable for use in the instant invention can be produced in a manner known in the art by forming a mixture of an N-alkyl-N-vinylacetamide and a vinyl ester and heating the mixture in contact with a free radical initiator at a temperature sufficiently elevated to cause these materials to react to produce the copolymer.

The N-alkyl-N-vinylacetamides employed as starting materials can be graphically depicted by the formula

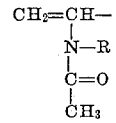

wherein R is an alkyl radical having from 1 to 3 carbon atoms, preferably from 1 to 2 carbon atoms, such as methyl, ethyl, propyl, and the like. Illustrative of such starting materials are such compounds as N-methyl-N-vinylacetamide, N-ethyl-N-vinylacetamide, N-propyl-N-vinylacetamide, and the like.

The vinyl esters employed as starting materials can be graphically depicted by the formula

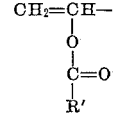

wherein R' is a radical selected from the group consisting of hydrogen and alkyl radicals having from 1 to 3 carbon atoms, preferably from 1 to 2 carbon atoms. Illustrative of such starting materials are such compounds as vinyl formate, vinyl acetate, vinyl propionate, and the like.

In order to obtain copolymers having the desired composition, polymerization should be effected between mixtures of N-alkyl-N-vinylacetamides and vinyl esters containing from about 30 mole percent to about 95 mole percent, preferably from about 30 mole percent to about 70 mole percent, of the N-alkyl-N-vinylacetamides.

Polymerization between an N-alkyl-N-vinylacetamide and a vinyl ester is promoted by a free radical initiator, including, for example, peroxides and azo compounds well known in the art. Among the peroxides which can be employed as initiators may be mentioned hydrogen peroxide, di-tertiary-butyl peroxide, tertiary-butyl hydroperoxide, and cumene hydroperoxide. Specific examples of the azo compounds which can be employed include $\alpha,\alpha'$-azo-bis-isobutyronitrile and 2,2'-dicyanoazobenzene. Copolymerization can also be initiated by ultraviolet light in the presence of a suitable activator such as benzoin. The initiators can be employed in an amount of from about 0.01 percent by weight to about 5 percent by weight, preferably from about 0.1 percent by weight to about 2 percent by weight, of the total amount of N-alkyl-N-vinylacetamide and vinyl ester present.

Polymerization between an N-alkyl-N-vinylacetamide and a vinyl ester readily occurs at temperatures ranging from as low as 0° C. to as high as 120° C., but is preferably effected at temperatures ranging from about 15° C. to about 90° C. The pressures employed in effecting polymerization can vary over a wide range. As a matter of convenience polymerization is usually effected in a closed system under autogenous pressure; however, pressures ranging from as low as 0.5 atmosphere to as high as 100 atmospheres, can be employed whenever it is desirable to do so.

Polymerization between an N-alkyl-N-vinylacetamide and a vinyl ester can be conducted in either a batchwise or continuous manner. When a batch procedure is employed, reaction is usually effected in a closed system under autogenous pressure. When the process is conducted continuously, the reactants are usually fed through a pressurized reactor.

The following examples are set forth for purposes of illustration so that those skilled in the art may better understand this invention, and it should be understood that they are not to be construed as limiting this invention in any manner.

*Example I*

To a glass pressure bottle were charged 30 grams (0.3 mole) of N-methyl-N-vinylacetamide, 30 grams (0.35 mole) of vinyl acetate, and 0.6 gram of $\alpha,\alpha'$-azo-bis-isobutyronitrile. The bottle was capped and agitated for twenty hours in a bath maintained at a temperature of 50° C. At the end of this time, the reaction mixture was cooled, diluted with acetone, and returned to the bath until the resin present dissolved. Heptane was then added to the solution, causing a precipitate to separate. The precipitate was collected and dried by heating at a temperature of 40° C. About 60 grams of a copolymer of N-methyl-N-vinylacetamide and vinyl acetate were recovered in this manner. The copolymer had a reduced viscosity of 0.78 in water at 30° C. and could be molded to form a plaque at 100° C.

Reduced viscosity ($I_R$) is a measure of the molecular weight of a polymer and can be defined by the equation:

$$I_R = \frac{\frac{\Delta N}{N_0}}{C}$$

wherein $\Delta N$ is the difference in seconds between the flow time of a solution of polymer through a capillary viscometer and the flow time of the solvent, $N_0$ represents the flow time of the solvent, and C is the concentration of polymer in said solution in grams per 100 milliliters of solution. Measurements were made at 30° C. using water or acetone as solvent, and a solution of 0.2 gram of polymer per 100 milliliters of solution.

*Example II*

To a glass pressure bottle were charged 0.5 gram (0.005 mole) of N-methyl-N-vinylacetamide, 4.5 grams (0.052 mole) of vinyl acetate, and 0.05 gram of $\alpha,\alpha'$-azo-bis-isobutyronitrile. The bottle was capped and agitated for twenty hours in a bath maintained at a temperature of 50° C. At the end of this time, the reaction mixture was cooled, diluted with acetone, and returned to the bath until the resin present dissolved. Heptane was then added to the solution, causing a precipitate to separate. The precipitate was collected and dried by heating at a temperature of 40° C. About 4.8 grams of a copolymer of N-methyl-N-vinylacetamide and vinyl acetate were recovered in this manner. The copolymer had a reduced viscosity of 0.97 in acetone at 30° C. The copolymer was soluble in acetone but insoluble in water.

*Example III*

To a glass pressure bottle were charged 10 grams (0.1 mole) of N-methyl-N-vinylacetamide, 40 grams (0.47 mole) of vinyl acetate, and 0.5 gram of $\alpha,\alpha'$-azo-bis-isobutyronitrile. The bottle was capped and agitated for twenty hours in a bath maintained at a temperature of 50° C. At the end of this time, the reaction mixture was cooled, diluted with acetone, and returned to the bath until the resin present dissolved. Heptane was then added to the solution, causing a precipitate to separate. The precipitate was collected and dried by heating at a temperature of 40° C. About 50 grams of a copolymer of N-methyl-N-vinylacetamide and vinyl acetate were recovered in this manner. The copolymer had a reduced viscosity of 1.27 in acetone at 30° C. The copolymer was soluble in acetone but insoluble in water.

*Example IV*

To a glass pressure bottle were charged 2 grams (0.02 mole) of N-methyl-N-vinylacetamide, 3 grams (0.035 mole) of vinyl acetate, and 0.05 grams of $\alpha,\alpha'$-azo-bis-isobutyronitrile. The bottle was capped and agitated for twenty hours in a bath maintained at a temperature of 50° C. At the end of this time, the reaction mixture was cooled, diluted with acetone, and returned to the bath until the resin present dissolved. Heptane was then added to the solution, causing a recipitate to separate. The precipitate was collected and dried by heating at a temperature of 40° C. About 5 grams of a copolymer of N-methyl-N-vinylacetamide and vinyl acetate were recovered in this manner. The copolymer had a reduced viscosity of 0.72 in water at 30° C. The copolymer was soluble in acetone and water.

*Example V*

To a glass pressure bottle were charged 37.5 grams (0.38 mole) of N-methyl-N-vinylacetamide, 12.5 grams (0.15 mole) of vinyl acetate, and 0.5 gram of $\alpha,\alpha$-azo-bis-isobutyronitrile. The bottle was capped and agitated for twenty hours in a bath maintained at a temperature of 50° C. At the end of this time, the reaction mixture was cooled, diluted with acetone, and returned to the bath until the resin present dissolved. Heptane was then added to the solution, causing a precipitate to separate. The precipitate was collected and dried by heating at a temperature of 40° C. About 50 grams of a copolymer of N-methyl-N-vinylacetamide and vinyl acetate were recovered in this manner. The copolymer had a reduced viscosity of 1.09 in water at 30° C. The copolymer was soluble in acetone and water.

*Example VI*

To a glass pressure bottle were charged 4 grams (0.04 mole) of N - methyl - N - vinylacetamide, 1 gram (0.012 mole) of vinyl acetate, and 0.05 gram of $\alpha,\alpha'$-azo-bis-isobutyronitrile. The bottle was capped and agitated for twenty hours in a bath maintained at a temperature of 50° C. At the end of this time, the reaction mixture was cooled, diluted with acetone, and returned to the bath until the resin present was dissolved. Heptane was then added to the solution, causing a precipitate to separate. The precipitate was collected and dried by heating at a temperature of 40° C. About 5 grams of a copolymer of N-methyl-N-vinylacetamide and vinyl acetate were recovered in this manner. The copolymer had a reduced viscosity of 1.63 in water at 30° C. The copolymer was soluble in acetone and water.

*Example VII*

To a glass pressure bottle were charged 2 grams (0.018 mole) of N - ethyl - N - vinylacetamide, 2 grams (0.018 mole) of vinyl propionate, and 0.04 gram of $\alpha,\alpha'$-azo-bis-isobutyronitrile. The bottle was capped and agitated for twenty hours in a bath maintained at a temperature of 50° C. At the end of this time, the reaction mixture was cooled, diluted with acetone, and returned to the bath until the resin present dissolved. Heptane was then added to the solution, causing a precipitate to separate. The precipitate was collected and dried by heating at a temperature of 40° C. About 3.8 grams of a copolymer of N-ethyl-N-vinylacetamide and vinyl acetate were recovered in this manner. The copolymer had a reduced viscosity of 0.36 in acetone at 30° C. The copolymer was soluble in acetone, methanol, toluene, and ethanol, but was insoluble in heptane and water.

*Example VIII*

To a glass pressure bottle were charged 3 grams (0.027 mole) of N-ethyl-N-vinylacetamide, 2 grams (0.018 mole) of vinyl propionate, and 0.05 gram of $\alpha,\alpha'$-azo-bis-isobutyronitrile. The bottle was capped and agitated for twenty hours in a bath maintained at a temperature of 50° C. At the end of this time, the reaction mixture was cooled, diluted with acetone, and returned to the bath until the resin present dissolved. Heptane was then added to the solution, causing a precipitate to separate. The precipitate was collected and dried by heating at a temperature of 40° C. About 3 grams of a copolymer of N-ethyl-N-vinylacetamide and vinyl acetate were recovered in this manner. The copolymer had a reduced viscosity of 0.10 in water at 30° C. The copolymer had a nitrogen content of 4.65 percent, which is equivalent to 37 percent of combined N-ethyl-N-vinylacetamide.

*Example IX*

An aerosol formulation suitable for spraying hair and other articles was prepared by admixing:

(A) 2 percent by weight of a copolymer having a reduced viscosity of 1.03 in water at 30° C. and prepared by copolymerizing a mixture containing 50 percent by weight of N-methyl-N-vinylacetamide and 50 percent by weight of vinyl acetate;

(B) 28 percent by weight of ethanol; and (C) 70 percent by weight of a propellant mixture composed of 40 percent by weight $CCl_2F_2$ and 60 percent by weight $CCl_3F$.

The mixture was sprayed on substrates such as glass, metal plates, and kraft paper to form a tough adherent film.

What is claimed is:

1. An aerosol formulation comprising a propellant and a solution containing from about 0.5 percent by weight to about 8 percent by weight of a copolymer composed of from about 10 mole percent to about 95 mole percent of units represented by the formula

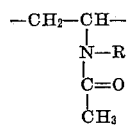

wherein R is alkyl having from 1 to 3 carbon atoms, and from about 5 mole percent to about 90 mole percent of units represented by the formula

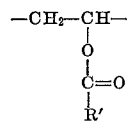

wherein R' is selected from the group consisting of hydrogen and alkyl having from 1 to 3 carbon atoms.

2. An aerosol formulation comprising a propellant and a solution containing from about 1 percent by weight to about 3 percent by weight of a copolymer composed of from about 30 mole percent to about 70 mole percent of units represented by the formula

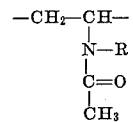

wherein R is alkyl having from 1 to 3 carbon atoms, and from about 30 mole percent to about 70 mole percent of units represented by the formula

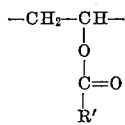

wherein R' is selected from the group consisting of hydrogen and alkyl having from 1 to 3 carbon atoms.

3. A process for setting hair which comprises applying to the hair an aerosol formulation comprising a propellant and a solution containing from about 1 percent by weight to about 3 percent by weight of a copolymer composed of from about 30 mole percent to about 70 mole percent of units represented by the formula

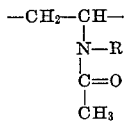

wherein R is alkyl having from 1 to 3 carbon atoms, and from about 30 mole percent to about 70 mole percent of units represented by the formula

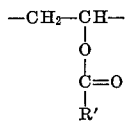

wherein R' is selected from the group consisting of hydrogen and alkyl having from 1 to 3 carbon atoms.

4. An aerosol formulation as in claim 1 wherein the copolymer is soluble in water.

5. An aerosol formulation as in claim 1 wherein the copolymer is a copolymer of N-methyl-N-vinylacetamide and vinyl acetate.

6. An aerosol formulation as in claim 2 wherein the copolymer is a copolymer of N-methyl-N-vinylacetamide and vinyl acetate.

7. An aerosol formulation as in claim 1 wherein the copolymer is a copolymer of N-ethyl-N-vinylacetamide and vinyl propionate.

8. An aerosol formulation comprising a propellant and a solution containing from about 1 percent by weight to about 3 percent by weight of a copolymer composed of from about 55 mole percent to about 80 mole percent of N-ethyl-N-vinylacetamide and from about 20 mole percent to about 45 mole percent of vinyl propionate.

References Cited by the Examiner

UNITED STATES PATENTS 2,231,905  2/41  Hanford et al.
2,764,454  9/56  Edelstein _____ 252—305

OTHER REFERENCES

Di Giacomo: American Perfumer and Aromatics, 69 (5): 45–50, May 1957.

Schimmel: Briefs, No. 303, Schimmel and Company Inc., Newburgh, New York, June 1960.

JULIAN S. LEVITT, *Primary Examiner.*

FRANK CACCIAPAGLIA, JR., LEWIS GOTTS,
*Examiners.*